July 1, 1952 O. L. WILKINS 2,602,160

RECOGNITION SYSTEM

Filed Sept. 12, 1942

Inventor

O. LEE WILKINS

By [signature]

Attorney

Patented July 1, 1952 2,602,160

UNITED STATES PATENT OFFICE 2,602,160

RECOGNITION SYSTEM

Oscar Lee Wilkins, Washington, D. C.

Application September 12, 1942, Serial No. 458,147
8 Claims. (Cl. 343—6)

(Granted under the act of March 3, 1883, as amended April 30, 1928; 370 O. G. 757)

This invention relates to a system of radio frequency communication, and it is particularly directed to a method of secret recognition or identification.

The principal object of the invention is to provide a system or method whereby remote craft may be recognized or identified as friendly or unfriendly while still remotely located.

Another object is to provide a secret means of identification which cannot easily be duplicated or utilized by hostile craft.

Another object is to provide a method of communication control by the challenging party which operates to confound hostile craft, but in no way disturbs the recognition response from friendly craft.

Other objects include the utilization of a special frequency multiplier or divider circuit in connection with the system which affords a simple means of converting the challenging signal and the recognition signal into a form capable of ready identification, and the provision of visual means for identification.

Still other objects of the invention will be apparent from the following description.

The principle on which this invention is based is the fact that it is virtually impossible to duplicate the frequency of a given radio wave (or its modulation frequency) by means of a separate generator with such accuracy that there will be no detachable variation in frequency when the two waves are compared, such as by heterodyning or visually by means of an oscilloscope. In applying the principle to this invention, a challenging station, called hereinafter the ground station or reference point to distinguish it from stations aboard moving craft, radiates a signal modulated by a frequency which is monitored by an oscilloscope. This monitored frequency is received by a friendly plane, ship or other craft and transmitted back to the ground station receiver, preferably via a different modulation frequency, where it is supplied to the same oscilloscope for comparison with the emitted modulation frequency. A one-cycle difference in one hundred thousand is instantly discernible. Thus signals emitted by hostile craft cannot possibly deceive the challenging station unless they contain the proper carrier frequencies and the modulation frequencies involved are identical with those selected for employed by the challenging and responding systems.

Figure 1:
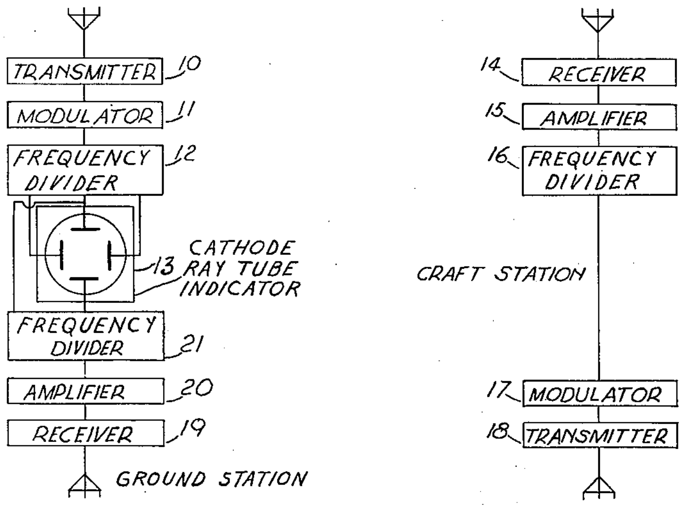
Figure 2:
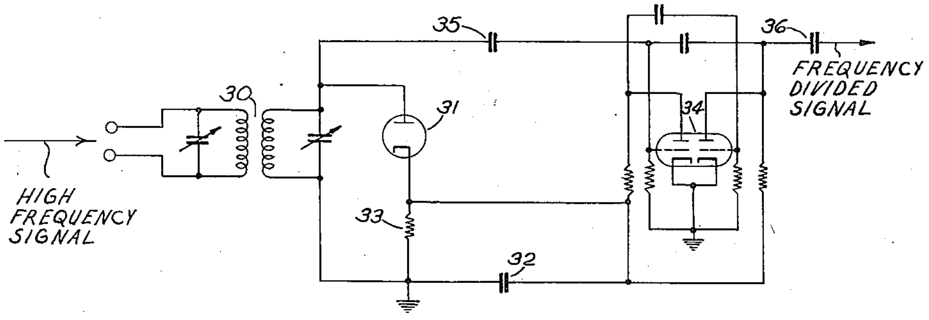

In order that the invention may be clearly understood, a typical embodiment thereof is described in detail with reference to the accompanying drawing, in which:

Fig. 1 is a block diagram of the system, showing the operation of the land station and the station on board the friendly craft; and Fig. 2 is a schematic diagram of the circuit employed for the frequency dividers shown in Fig. 1.

Referring to Fig. 1 a transmitter 10 is designed to operate at any designated high-frequency. The transmitter 10 (or carrier wave produced thereby) is amplitude modulated by a modulator 11 at an arbitrary frequency preferably above the audio range, and for description it will be assumed to be 100 kilocycles. The percentage modulation need not be large. The modulator 11 contains a variable oscillator as the source of the modulation frequency. The oscillator may be conveniently varied two or three kilocycles, although the precise range of the variation is not important. The significance of this ability to vary the modulation frequency at will, will be apparent further on. A small part of the 100 kc. modulation signal is supplied from the modulator 11 to a frequency divider 12, which may be of the multi-vibrator type, a preferred modification of which is shown in Fig. 2. The frequency divider 12 is locked unshakably to the modulating frequency on a sub-harmonic, such as the tenth sub-harmonic, thus producing a ten kc. signal. This sub-harmonic signal is supplied to a deflection circuit (for example the horizontal plates) of an oscilloscope 13 which is preferably of the cathode ray type. Other sub-harmonics may be used, but ten kilocycles is sufficiently low to be handled efficiently by the oscilloscope. In order to see any pattern on the screen of the oscilloscope it is necessary to sweep the ten kc. signal on the horizontal deflection circuit with a signal on the vertical deflection circuit. What the frequency of this sweeping signal will be and how it is derived is as follows:

The high-frequency signal modulated at 100 kc. which leaves the transmitter 10 is received on board the friendly craft by a receiver 14. From the receiver 14 the modulation component of the received wave is supplied to an amplifier 15 and then to a frequency divider 16. The frequency divider 16 may be of the same type as the divider 12, but for the greatest concealment from hostile forces it is designed to operate at a different sub-harmonic, such as the second sub-harmonic, or 50 kc. This 50 kc. signal remains unshakably locked with the 100 kc. modulating frequency of the transmitter 10 and will vary only when the 100 kc. modulation frequency varies. The 50 kc. signal from the divider 16 is supplied to a modulator 17 which, in turn, modulates a high frequency carrier radio wave produced by the friendly craft's transmitter 18. The frequency of this carrier wave is preferably different from that generated by the transmitter 10 to avoid inteference.

The 50 kc. modulated wave from the transmitter 18 is received by a receiver 19 at the ground station and the 50 kc. modulation component is supplied to an amplifier 20 and then to another frequency divider 21. The frequency divider 21 is preferably designed to operate at the same frequency as the derived 12, or ten kc., thus reducing the modulation signal received from the amplifier 20 to its fifth sub-harmonic. The ten kc. signal from the frequency divider 21 is applied to the vertical deflection circuit of the oscilloscope 13, thus providing the sweep signal for the ten kc. signal on the horizontal circuit. Since the two signals on the horizontal and vertical deflection circuits are identical a one-to-one figure will be produced on the oscilloscope screen. Any phase difference caused by the craft's travel can be ignored or utilized to cover the rate of change of distance of the craft relative to the land station. However, for frequencies as low as ten kc. such a phase shift caused by the movement of the craft is extremely small.

Of course any standard frequency divider circuits may be employed in the dividers 12, 16 and 21, but it is desirable that they be adjusted or designed so that there is no self-oscillation in the absence of the locking signal. A particularly efficient multivibrator circuit of this type is shown in Fig. 2. In this circuit the modulation signal is supplied to a tuned transformer 30. The output from the transformer 30 is supplied in part to a rectifier 31 and filter system consisting of a condenser 32 and a resistance 33. In this manner part of the modulation signal appears as a direct current voltage across the resistance 33, the negative end of which is connected to ground. A dual triode vacuum tube 34 (or two separate triodes) and associated condensers and resistors are connected together in a conventional multivibrator circuit, the operation of which is well understood in the art. The power to operate the multivibrator circuit, or positive voltage for the plates of the tube 34, is obtained by connecting the plates, through suitable resistances, to the positive end of the resistance 33. The locking signal voltage is supplied to the multivibrator through a condenser 35 connected from one side of the transformer 30 to a grid of the tube 34, and the multivibrator output signal is supplied through a condenser 36, all in conventional manner. In this way the modulation signal supplied to the multivibrator serves the dual function of locking the multivibrator frequency and supplying the power to run it. Thus the multivibrator will not operate except when the locking voltage is present and it always will operate at only the desired frequency. The above multivibrator circuit and its operation are described and claimed in copending application Serial No. 442,340, filed May 9, 1942, in the name of William A. McCool, now Patent No. 2,377,894.

It is obvious that the modulation frequency received on board the craft need not be reduced to a sub-harmonic for re-transmission, but it may be used to modulate the craft's carrier wave at the same frequency. There is, however, more chance for enemy discovery of the system if the modulation frequency of the challenging wave is identical to that of the recognition signal. Also, the modulation frequency may be multiplied on board the craft and returned as a harmonic of the modulation frequency of the ground station. There is no need to observe any particular modulation wave form, pulse modulation (i. e. over 100%) being suitable if its extra trouble is warranted under unusual conditions. Also frequency modulation instead of amplitude modulation may be employed at one or both stations if desired. The frequency of the ground station moduation may be varied at will, and it is precisely by varying it at random or unexpectedly that a spurious signal from hostile craft can be instantly detected, for the hostile craft cannot follow the frequency change so exactly as to avoid a change in phase between the two signals injected into the cathode ray tube. In fact, if it is believed that the relatively steady modulation frequency of an oscillator would be detected by hostile craft, other modulation signals having complex wave forms may be used. Although the cathode ray tube, or oscilloscope, will not portray the true wave form, due to the characteristics of the frequency dividers, it makes no difference because a stationary pattern will be obtained as long as the frequencies are the same at any given instant. If it is desired to omit the frequency dividers entirely a lower modulation frequency should be chosen for the practical reason that excessive signal voltages would be necessary to provide a reasonable sweep in the oscilloscope.

The invention described herein may be manufactured and used by or for the Government of the United States of America for governmental purposes without the payment of any royalties thereon or therefor.

I claim:

1. Method of identifying remote craft as friendly or unfriendly which comprises, radiating a first radio wave at a predetermined frequency from a reference point, modulating said first radio wave at a first modulation frequency, receiving said first radio wave on friendly craft, transmitting a second radio wave from said friendly craft, modulating said second radio wave in accordance with the modulation of said first radio wave at a second modulation frequency different from the first modulation frequency and harmonically related thereto, receiving said second radio wave at said reference point and indicating the frequency ratio of the modulation frequencies.

2. Method of identifying remote craft as friendly or unfriendly which comprises, radiating a first radio wave at a predetermined frequency from a reference point, modulating said first radio wave at a first modulation frequency, receiving said first radio wave on friendly craft, transmitting a second radio wave from said friendly craft at a frequency different from the frequency of said first radio wave, modulating said second radio wave, controlling the modulation frequency of said second radio wave by the modulation frequency of said first radio wave at a second modulation frequency different from the first modulation frequency and harmonically related thereto, receiving said second radio wave at said reference point and indicating the frequency ratio of the modulation frequencies.

3. Method of identifying remote craft as friendly or unfriendly which comprises, radiating a first radio wave at a selected frequency from a reference point, modulating said first radio wave at a first modulation frequency above the audible range, receiving said first radio wave on friendly craft, transmitting a second radio wave from said friendly craft at a frequency different from the frequency of said first radio wave, modulating said second radio wave, controlling the modulation frequency of said second radio wave by the modulation frequency of said first radio wave at a second modulation frequency different from the first modulation frequency and harmonically related thereto, receiving said second radio wave at said reference point and indicating the frequency ratio of the modulation frequencies.

4. In a system for identifying remote craft as friendly or unfriendly, means for radiating a first radio wave at a predetermined frequency from a reference point, means for modulating said first radio wave at a first modulation frequency, means on friendly craft for receiving said first radio wave, means on said craft for transmitting a second radio wave, means for modulating said second radio wave in accordance with the modulation of said first radio wave at a second modulation frequency different from the first modulation frequency and harmonically related thereto, means at said reference point for receiving said second radio wave, and means for indicating the frequency ratio of the modulation frequencies of said radio waves.

5. In a system for identifying remote craft as friendly or unfriendly, means for radiating a first radio wave at a predetermined frequency from a reference point, means for modulating said first radio wave at a first modulation frequency, means on friendly craft for receiving said first radio wave, means on said craft for obtaining the modulation frequency of the received wave as a separate signal, means on said craft for transmitting a second radio wave at a frequency different from the frequency of said first radio wave, means for modulating said second radio wave in accordance with the separate signal at a second modulation frequency different from the first modulation frequency and harmonically related thereto, means at said reference point for receiving said second radio wave, and means for indicating the frequency ratio of the modulation frequencies.

6. In a system for identifying remote craft as friendly or unfriendly, means for radiating a first radio wave at a predetermined frequency from a reference point, first modulating means cooperating with said means for radiating whereby said first radio wave is modulated at a first modulation frequency, receiving means on friendly remote craft for receiving said first radio wave and transforming the modulation thereof into a lower frequency modulation harmonically related to the first modulation frequency, transmitting means on said craft for radiating a second radio wave at a frequency different from the frequency of said first radio wave, second modulating means cooperating with said receiving means and said transmitting means whereby said second radio wave is modulated at a frequency controlled by the lower frequency modulation, receiving means at said reference point for receiving said second radio wave and transforming the lower frequency modulation thereof into a demodulated signal, and indicating means cooperating with said first modulation means and said receiving means at said reference point whereby the frequency relationship of the first modulation frequency and the demodulated signal is indicated.

7. Means as claimed in claim 6 wherein said indicating means comprises reducing means for converting said first modulation frequency and said demodulated signals to sub-harmonics of the same frequency and a cathode ray tube cooperating with said reducing means to produce a predetermined screen pattern, said reducing means comprising a plurality of multivibrator circuits and high frequency rectifier circuits, wherein one rectifier circuit is connected to receive first modulation frequency signals and another rectifier circuit is connected to receive demodulated signals whereby said multivibrator circuits are supplied with power to oscillate synchronized to a sub-harmonic of the applied signal only during the time that the corresponding rectifier receives a signal.

8. In a system for identifying remote craft as friendly or unfriendly, means for emitting at a first locality a first carrier wave modulated with a first signal, remote receiving means adapted to be installed on a friendly craft for intercepting the first carrier wave, first frequency alteration means connected to the output of the remote receiving means for producing a second signal harmonically related to the first signal, a carrier frequency generator connected to the output of the first frequency alteration means operative to produce a second carrier wave modulated with the second signal, means at the first locality for receiving the second carrier wave and reproducing the second signal, second frequency alteration means connected to the output of the last named means operative to derive a third signal harmonically related to the second signal, third frequency alteration means at the first locality connected to the first named means operative to derive from the first signal a fourth signal at the same frequency as the third signal, and means connected to the outputs of the second and third frequency alteration means operative to indicate the frequency ratio.

O. LEE WILKINS.

REFERENCES CITED

The following references are of record in the file of this patent:

UNITED STATES PATENTS

| Number | Name | Date |
|---|---|---|
| 1,690,299 | Horton | Nov. 6, 1928 |
| 2,134,716 | Gunn | Nov. 1, 1938 |
| 2,155,821 | Goldsmith | Apr. 25, 1939 |
| 2,198,113 | Holmes | Apr. 23, 1940 |
| 2,206,896 | Higgins et al. | July 9, 1940 |
| 2,218,923 | Newhouse | Oct. 22, 1940 |
| 2,248,727 | Strobel | July 8, 1941 |
| 2,470,787 | Nosker | May 24, 1949 |